United States Patent
Anand et al.

(10) Patent No.: US 12,354,123 B2
(45) Date of Patent: Jul. 8, 2025

(54) MACHINE LEARNING MODEL FOR PREDICTING WAIT TIMES TO RECEIVE ORDERS AT DIFFERENT LOCATIONS

(71) Applicant: Maplebear Inc., San Francisco, CA (US)

(72) Inventors: Radhika Anand, Sunnyvale, CA (US); Ajay Pankaj Sampat, San Francisco, CA (US); Caleb Grisell, Los Angeles, CA (US); Youdan Xu, Burlingame, CA (US); Krishna Kumar Selvam, San Francisco, CA (US); Bita Tadayon, Dallas, TX (US)

(73) Assignee: Maplebear Inc., San Francisco, CA (US)

( * ) Notice: Subject to any disclaimer, the term of this patent is extended or adjusted under 35 U.S.C. 154(b) by 197 days.

(21) Appl. No.: 18/066,257

(22) Filed: Dec. 14, 2022

(65) Prior Publication Data
US 2024/0202748 A1    Jun. 20, 2024

(51) Int. Cl.
*G06Q 30/0202* (2023.01)
(52) U.S. Cl.
CPC .............................. *G06Q 30/0202* (2013.01)
(58) Field of Classification Search
None
See application file for complete search history.

(56) References Cited

U.S. PATENT DOCUMENTS

| | | | | |
|---|---|---|---|---|
| 5,734,837 A * | 3/1998 | Flores | | G06Q 10/10 |
| | | | | 705/7.26 |
| 7,389,249 B2 * | 6/2008 | Hsu | | G06Q 10/087 |
| | | | | 705/28 |
| 8,458,007 B2 * | 6/2013 | Shafiee | | G06Q 10/06316 |
| | | | | 705/7.26 |
| 10,803,413 B1 * | 10/2020 | Xu | | G06Q 10/067 |
| 2012/0143755 A1 * | 6/2012 | Burrell | | G06Q 20/1085 |
| | | | | 707/E17.014 |
| 2013/0275163 A1 * | 10/2013 | Kaiser | | G06Q 10/0631 |
| | | | | 705/5 |

(Continued)

FOREIGN PATENT DOCUMENTS

WO    WO-2018068026 A1 * 4/2018 .............. B25J 5/007

OTHER PUBLICATIONS

Steve "What is Order Fulfillment?", eFulfillment service, Jan. 2013, pp. 1-25 (Year: 2013).*

(Continued)

*Primary Examiner* — Romain Jeanty
(74) *Attorney, Agent, or Firm* — Fenwick & West LLP

(57) ABSTRACT

Techniques for predicting a wait time for a shopper based on a location the shopper's client device are presented. A system identifies a shopper's current location and uses a machine learning model to predict a wait time until the shopper will receive one or more orders. The machine learning model is trained to use input features including a number of orders received during a current time period for fulfillment near the current location, a number of other shoppers available for fulfilling orders during the current time period near the current location, historical information about a presentation of a plurality of orders to a plurality of shoppers near the current location, and historical information about the shopper and the other nearby available shoppers. The system then sends the predicted wait time to the client device for presentation to the shopper.

20 Claims, 8 Drawing Sheets

(56) References Cited

U.S. PATENT DOCUMENTS

| | | | |
|---|---|---|---|
| 2016/0048894 A1* | 2/2016 | Kaiser | G06Q 10/02 |
| | | | 705/26.41 |
| 2017/0236177 A1 | 8/2017 | Sebastian et al. | |
| 2018/0032928 A1 | 2/2018 | Li et al. | |
| 2019/0219408 A1 | 7/2019 | O'Mahony et al. | |
| 2020/0098035 A1* | 3/2020 | Dunjic | G06Q 30/0635 |
| 2020/0158525 A1 | 5/2020 | Rakah et al. | |
| 2020/0410864 A1* | 12/2020 | Ripert | G08G 1/20 |
| 2023/0113386 A1* | 4/2023 | Nejad | G06Q 30/0633 |
| | | | 705/26.8 |

OTHER PUBLICATIONS

PCT International Search Report and Written Opinion, PCT Application No. PCT/US2023/78840, Mar. 4, 2024, 10 pages.

* cited by examiner

MACHINE LEARNING MODEL FOR PREDICTING WAIT TIMES TO RECEIVE ORDERS AT DIFFERENT LOCATIONS

BACKGROUND

An online concierge system is an online platform that connects customers and retailers. A customer can place an order to purchase items, such as groceries, from participating retailers via the online concierge system. A shopper picks the ordered items at the retailer and then delivers the order to the customer's address.

When a shopper wants to work, the shopper can log into a mobile application and set the shopper's status to be available to work. The online concierge system then makes one or more orders available for the shopper to accept via the mobile application. The online concierge system may make several orders available to multiple shoppers, giving each shopper the opportunity to accept an order or wait for a more desirable order. Generally, each order is associated with a store or warehouse and a customer location (for delivery), so different orders may pay different compensation. Therefore, shoppers may choose to wait for orders that they find preferable. However, it can be a bad experience for a shopper to have to wait too long for a desirable order.

In some instances, orders may be made available to only those shoppers that are within a geographical area associated with an order, and shoppers may not be aware that better orders are available at nearby locations. Shoppers typically want to receive orders as soon as possible or have a reasonable expectation of when they are likely to receive an order, but shoppers also want to know a good location where they are likely to receive an order sooner.

SUMMARY

In accordance with one or more aspects of the disclosure, methods, systems, and computer-readable media for dynamically predicting wait times for a shopper and/or suggesting a location where the shopper is likely to receive an order sooner are presented. In some embodiments, a system identifies a current location of a shopper based on a location of a client device of the shopper. The system then uses a machine learning model to predict a wait time (also referred to as a first wait time) until the shopper at the current location will receive one or more orders. The machine learning model is trained to use input features, including (1) a number of orders received during a current time period for fulfillment near the current location (e.g., within a distance threshold from the current location), (2) a number of other shoppers available for fulfilling orders during the current time period near the current location, (3) historical information about a presentation of a plurality of orders to a plurality of shoppers available for fulfilling orders near the current location, and (4) historical information about the shopper and the other shoppers available for fulfilling orders during the current time period near the current location. The system then sends the predicted wait time to the client device for presentation to the shopper.

In some embodiments, the system determines whether at least one of the following has changed: (1) the current location of the shopper, (2) the number of orders received during a current time period for fulfillment near the current location, or (3) the number of the other shoppers available for fulfilling orders during the current period near the current location. Responsive to determining a change of at least one of the above, the system reuses the machine learning model to predict an updated wait time, and sends the updated predicted wait time to the client device for presentation.

In some embodiments, the system uses the machine learning model to predict a second wait time until the shopper will receive one or more orders if the shopper is located at the second location. The machine learning model is trained using input features including (1) a number of orders received during a current time period for fulfillment near the second location, (2) a number of other shoppers available for fulfilling orders during the current time period near the second location, (3) historical information about a presentation of a plurality of orders to a plurality of shoppers near the second location, and (4) historical information about the shopper and the other shoppers available for fulfilling orders near the second location. In some embodiments, the system also predicts a travel time of the shopper from the current location to the second location. In some embodiments, the system also predicts a third wait time including the second wait time and the travel time of the shopper from the current location to the second location. In some embodiments, the system suggests the second location to the shopper based on the first wait time and the third wait time. For example, in some embodiments, the system determines whether the third wait time is less than the first wait time, and responsive to determining that the third wait time is shorter than the first wait time, the system suggests the second location to the shopper. In some embodiments, the system also displays a map showing the current location and the second location. In one or more embodiments, in suggesting a location to a shopper, the system may cause a client device associated with the shopper to display and/or otherwise present one or more graphical user interfaces comprising information associated with the suggested location.

In some embodiments, the system further predicts a likelihood that the shopper will accept an order at the second location based on the historical information about the shopper, and responsive to the predicted likelihood greater than a threshold, the system suggests the second location to the shopper.

In some embodiments, the system further compares an actual wait time with a predicted wait time of the shopper associated with a location to determine a difference between the actual wait time and the predicted wait time. Responsive to determining that the difference between the actual wait time and the predicted wait time is greater than a threshold for the shopper, the system includes the actual wait time as additional training data to tune or retrain the machine learning model. In some embodiments, responsive to determining that the difference between the actual wait time and the predicted wait time is greater than a threshold for the shopper, the system stops showing wait time predictions of the location to the shopper.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
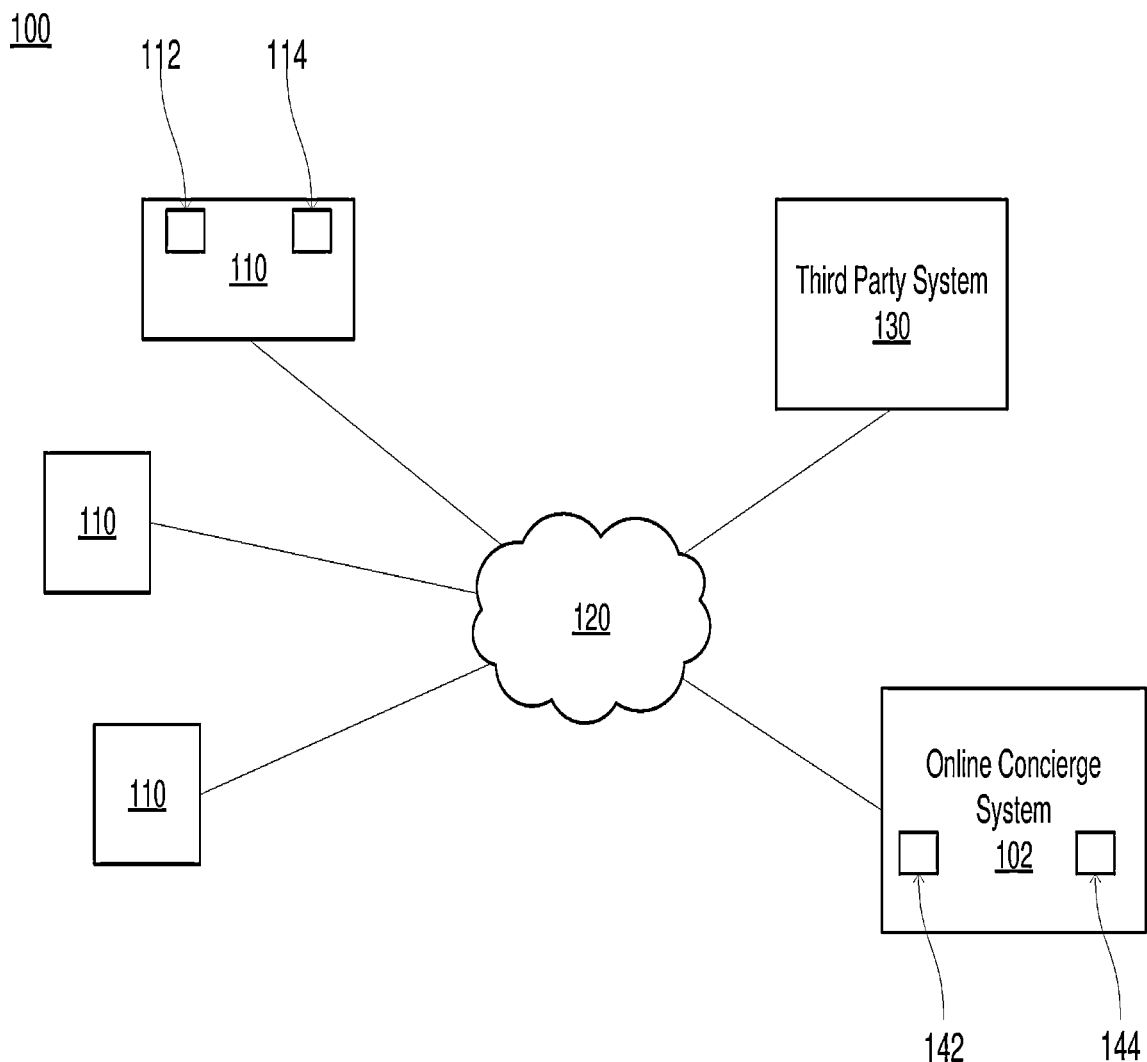
FIG. 1 is a block diagram of a system environment in which an online system, such as an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 5A and 5B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 5A and 5B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described above in conjunction with FIGS. 2-7. For example, the memory 144 has instructions encoded thereon that, when executed by the processor 142, cause the processor 142 to dynamically predict wait times for a shopper and/or suggest a location where the shopper is likely to receive an order sooner. In particular, the processor 142 identifies a current location of a shopper based on a location of a client device of the shopper. The processor then uses a machine learning model to predict a wait time until the shopper at the current location will receive one or more orders. The machine learning model is trained to use input features, including (1) a number of orders received during a current time period for fulfillment near the current location (e.g., within a distance threshold from the current location), (2) a number of other shoppers available for fulfilling orders during the current time period near the current location, (3) historical information about a presentation of a plurality of orders to a plurality of shoppers near the current location, and (4) historical information about the shopper and the other shoppers available for fulfilling orders. The processor then sends the predicted wait time to the client device for presentation to the shopper.

Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-7, and may include specific computing components such as processors, memories, communication interfaces, and/or the like.

System Overview

Figure 2:
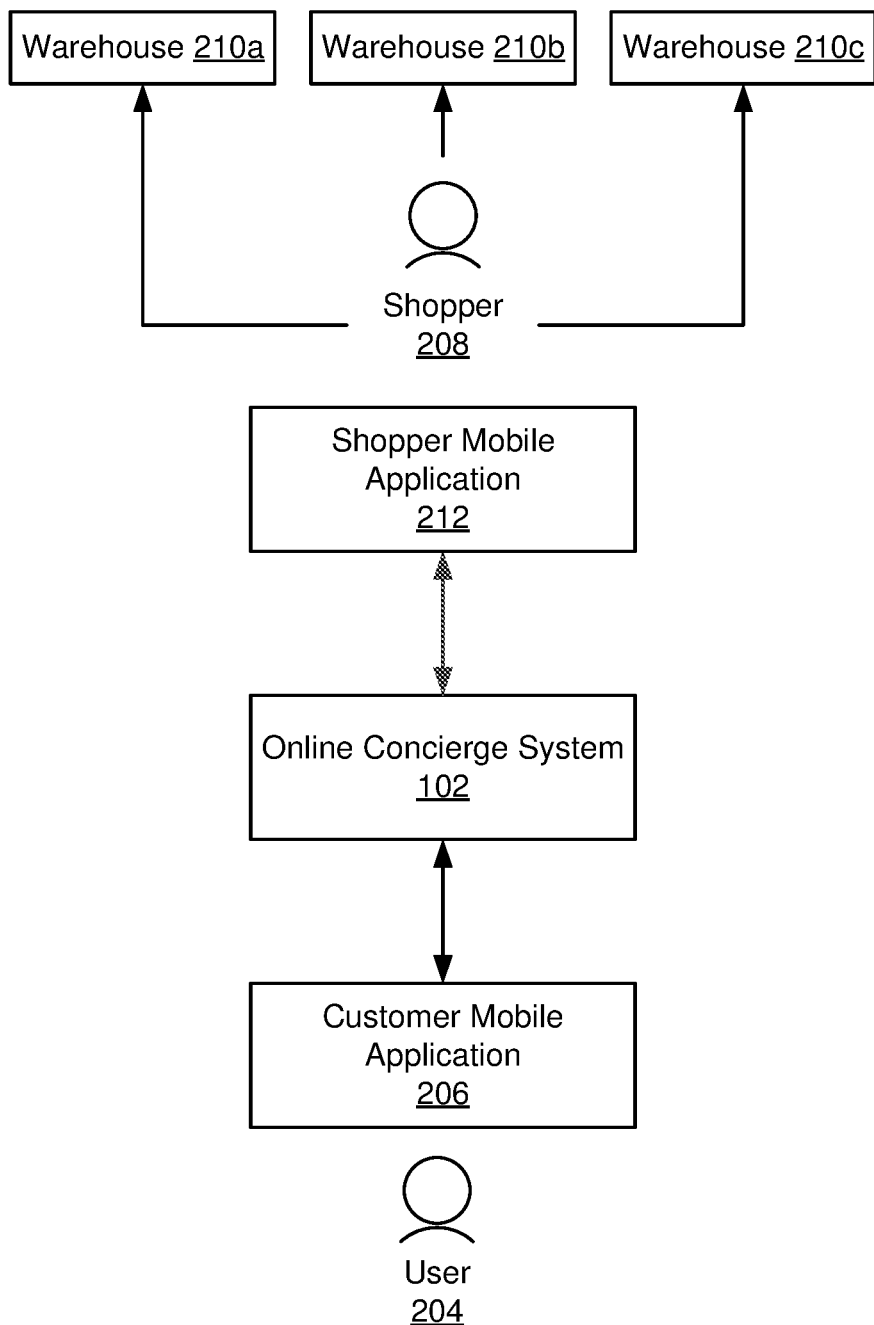
FIG. 2 illustrates an environment of an online shopping concierge service, according to one or more embodiments.

FIG. 2 illustrates an environment 200 of an online platform, such as an online concierge system 102, according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery.

In one embodiment, shoppers 208 make use of a shopper mobile application 212 which is configured to interact with the online concierge system 102. In some embodiments, shopper mobile application 212 of each shopper is configured to determine a current location of the shopper based on a client device on which the shopper mobile application 212 is installed. The shopper mobile application 212 sends the current location of the shopper to the online concierge system 102. As such, the online concierge system 102 knows a number of available shoppers within a given area. The online concierge system 102 also knows a number of orders received during a current time period for fulfillment near the given area. Additionally, the online concierge system 102 also has historical information about a presentation of a plurality of orders to a plurality of shoppers within the given area, and historical information about available shoppers for fulfilling orders within the given area. Based on such information, the online concierge system 102 is configured to train a machine learning model to predict a wait time until a particular shopper at a particular location will receive one or more orders. The predicted wait time can then be sent to the shopper mobile application 212 for display to the particular shopper.

In some embodiments, the online concierge system 102 is also able to predict additional wait times for a given shopper, if the given shopper were to move to alternative locations. The alternative locations may be within a predetermined threshold from the current location of the given shopper, and/or within a predetermined threshold from one or more retailers or warehouse 210. The online concierge system 102 may also provide the predicted wait times for the alternative locations to the shopper. In some embodiments, the online concierge system 102 is also configured to compute a travel time for the shopper from the current location to an alternative location. In some embodiments, if a combined travel time and wait time for the alternative location is less than the wait time for the current location, the online concierge system 102 suggests the alternative location to the shopper. Additional details about the online concierge system 102 are further discussed with respect to FIG. 3.

Figure 3:
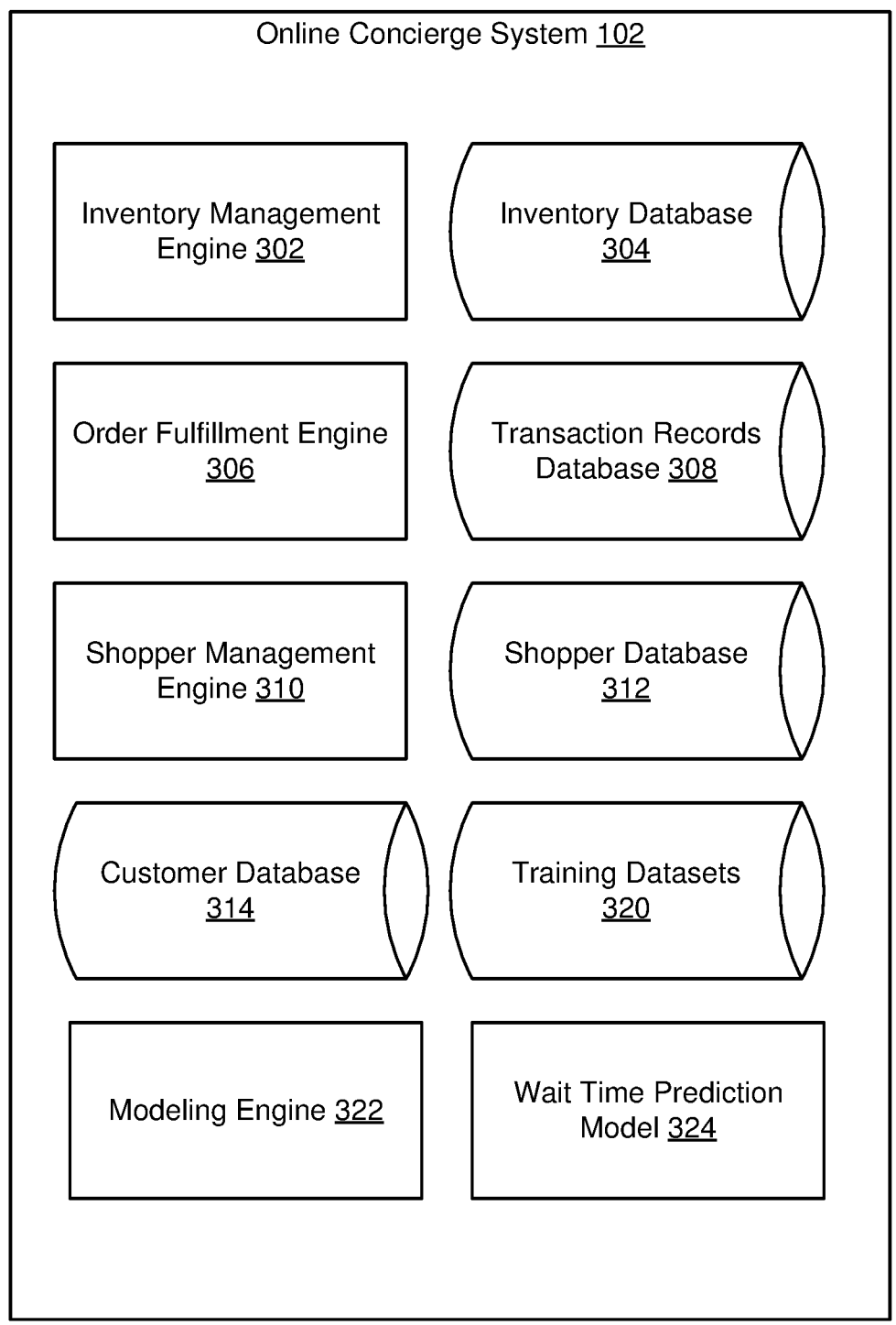
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the wait time prediction model 324. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a wait time prediction model 324, the contents of the order, the inventory of the warehouses, and the proximity to the delivery location. The shopper management engine e10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfillment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine Learning Models

The online concierge system 102 further includes training datasets 320, a modeling engine 322, and a wait time prediction model 324. The modeling engine 318 uses the training datasets 320 to generate the wait time prediction model 324. The wait time prediction model 324 can learn from the training datasets 320, rather than follow only explicitly programmed instructions. The shopper management engine 310 can use the wait time prediction model 324 to predict a wait time for a particular shopper at their current location or a different location, and send the predicted wait time to the particular shopper via the shopper mobile application 212.

Figure 4:
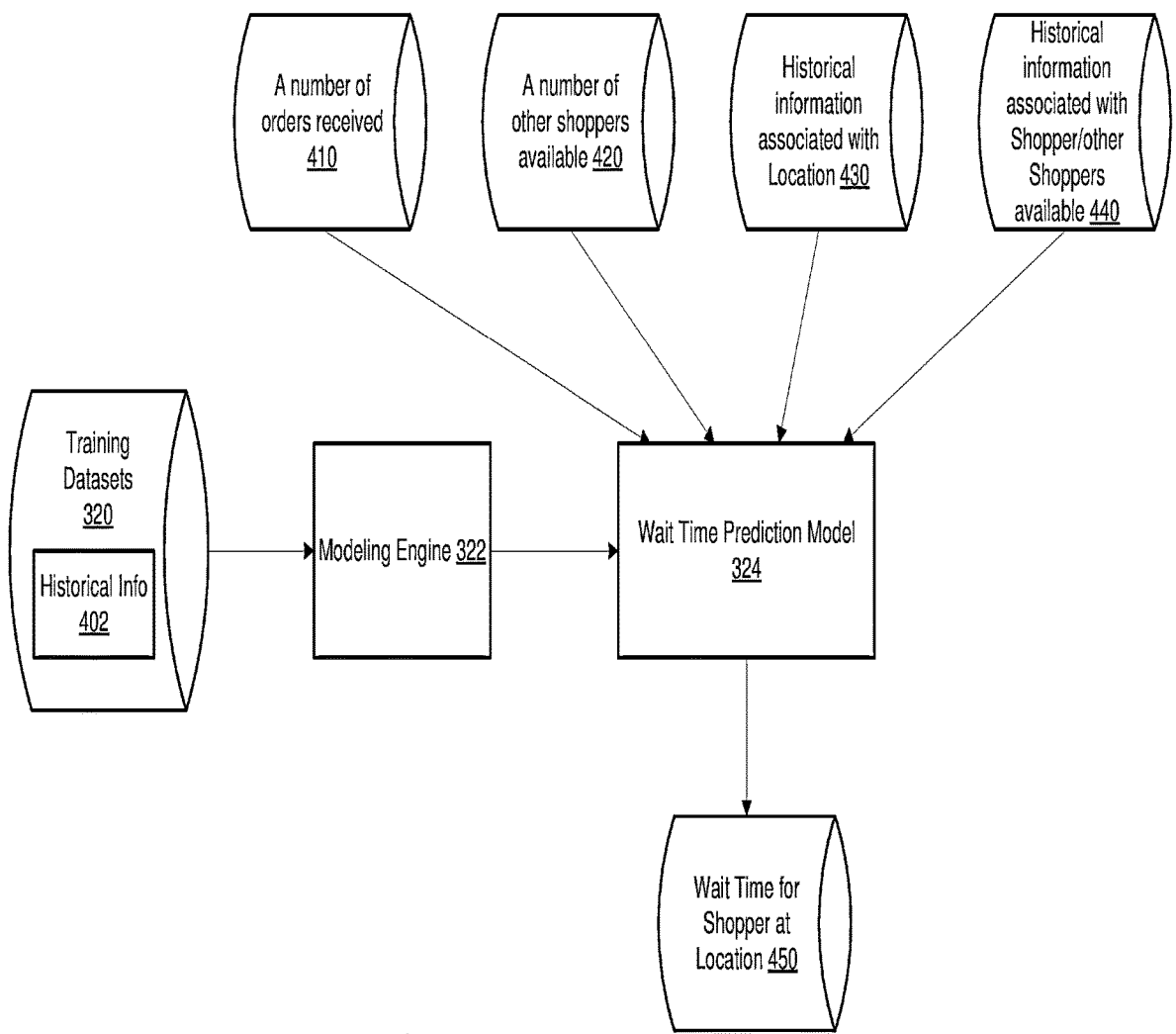
FIG. 4 is a diagram of an example process of using a machine learning model to predict a wait time for a shopper at a location.

FIG. 4 illustrates an example process of training and using the wait time prediction model 324 to predict a wait time of a shopper, in accordance with an embodiment. As illustrated, the training datasets 320 includes historical information 402 associated with a plurality of orders fulfilled by a plurality of shoppers at a plurality of retailers. The historical information 402 includes (but is not limited to), for each of a plurality of areas and/or each of a plurality of time periods, historical information about a presentation of a plurality of orders to a plurality of shoppers available for fulfilling orders in the area, and historical information about the plurality of shoppers, such as a wait time for each of the plurality of shoppers to receive an order, an expertise level of each of the plurality of shoppers, a willingness of a shopper to move to a new area, etc.

The modeling engine 322 receives the training datasets 320 and uses the training dataset 320 to generate the wait time prediction model 324. The wait time prediction model 324 is trained to receive input features, including (1) a number of orders received 410 during a current time period for fulfillment at a particular location (which may be a current location of the shopper or a second location that is within a distance threshold of the shopper), (2) a number of other shoppers available 420 for fulfilling orders during the current time period at the particular location, (3) historical information associated 430 with the particular location, such as historical information about a presentation of a plurality of orders to a plurality of shoppers at the current location, and (4) historical information 440 associated with the shopper and the other shoppers available for fulfilling orders at the particular location. In some embodiments, the historical information 430 associated with the particular location includes information about a presentation of a plurality of orders to a plurality of shoppers available for fulfilling orders near the particular location. In some embodiments, the historical information 440 associated with the shopper and the other shoppers includes historical orders that a shopper has fulfilled at the current location or other locations.

In some embodiments, the historical information 440 associated with the shopper and the other shoppers include an expertise level of a shopper determined based on the historical orders that the shopper has fulfilled, such as a number and/or a frequency of the shopper successfully fulfilling orders, an average time required for the shopper to fulfill an order or a batch of orders, etc. In some embodiments, the shopper management engine 310 prioritizes a shopper with a higher expertise level. As such, a shopper with a higher expertise level would generally result in a lower wait time compared to a shopper with a lower expertise level.

Based on the input features 410-440, the wait time prediction model 324 predicts a wait time 450 for the shopper until the shopper will receive one or more orders, assuming that the shopper is at the particular location. For example, the particular location may be the current location of the shopper, and the wait time prediction model 324 can predict a wait time for the shopper at the current location. As another example, the particular location may be any location, such as a second location that is within a distance threshold from the current location of the shopper and/or within a distance threshold to a retail store. The wait time prediction model 324 can predict a wait time for the shopper at the second location, assuming that the shopper can relocate to the second location. In some embodiments, the wait time prediction model 324 is further configured to predict a travel time of the shopper from the current location to the second location, and include the travel time to the predicted wait time 450 of the second location.

In some embodiments, the online concierge system 102 is configured to determine whether at least one of the following has changed: (1) the current location of the shopper, (2) the number of orders during the current time period near the current location, or (3) the number of other shoppers available for fulfilling orders during the current period near the current location. Responsive to determining that at least one of the above information has changed, the online concierge system 102 sends the updated information to the wait time prediction model 324, causing the wait time prediction model 324 to update its prediction.

In some embodiments, the shopper management engine 310 is further configured to suggest a second location to the shopper based on a first wait time predicted based on the current location of the shopper, and one or more second wait times predicted based on one or more second locations. In some embodiments, the shopper management engine 310 determines whether the shopper is likely to get an order sooner if the shopper moves to the second location considering (1) a travel time for the shopper to travel from the current location to the second location, and (2) the predicted second wait time based on the second location. Responsive to determining that the shopper is likely to get an order sooner if the shopper moves to the second location, the shopper management engine 310 suggests the second location to the shopper.

In some embodiments, the shopper management engine 310 is further configured to predict a likelihood that the shopper will accept an order at the second location based on the historical information about the shopper, such as a number of orders and/or a frequency that the shopper has fulfilled order at the second location. Only when the predicted likelihood is greater than a threshold, the shopper management engine 310 suggests the second location to the shopper.

After the shopper receives the suggestion, the shopper may decide to stay at their current location or move to one of the suggested locations. Regardless of whether the shopper moves, the shopper may eventually receive an order after an actual wait time. In some embodiments, the shopper management engine 310 is further configured to compare the actual wait time with a predicted wait time of the shopper associated with a current location or a second location to determine a difference therebetween. In some embodiments, responsive to determining that the difference between the actual wait time and the predicted wait time is greater than a threshold, the shopper management engine 310 may include data associated with the actual wait time as an additional training sample to train or retrain the wait time prediction model 324.

Alternatively, or in addition, the shopper management engine 310 may aggregate the differences between actual wait times and predicted wait times associated with the shopper and/or the location for a predetermined period. Responsive to determining that an average difference between the actual wait time and the predicted wait time associated with the shopper and/or the location is greater than a threshold, the shopper management engine 310 stops showing wait time predictions associated with the shopper and/or location.

In some embodiments, even though the shopper management engine 310 stops showing the predictions to the shopper, the wait time prediction model 324 may continue predicting wait times, comparing the predicted wait times with actual wait times, and tuning or retraining itself based on the actual wait times and/or differences between the actual wait times and predicted wait times. The shopper management engine 310 may also continue to aggregate the differences between the actual wait times and the predicted wait times associated with the shopper and/or the location. The shopper management engine 310 may restart to show the predictions to the shopper in response to determining that the wait time prediction model 324 has been tuned or retrained to be sufficiently accurate.

Customer Mobile Application

Figure 5A:
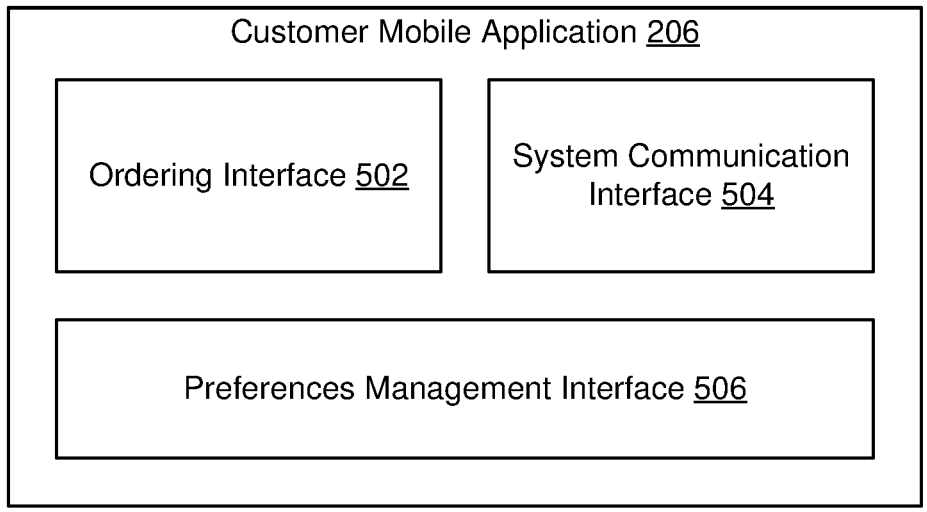
FIG. 5A is a diagram of a customer mobile application (CMA), according to one or more embodiments.

FIG. 5A is a diagram of the customer mobile application (CMA) 206, according to one or more embodiments. The CMA 206 includes an ordering interface 502, which provides an interactive interface with which the user 104 can browse through and select products and place an order. The CMA 206 also includes a system communication interface 504 which, among other functions, receives inventory information from the online shopping concierge system 102 and transmits order information to the system 202. The CMA 206 also includes a preferences management interface 506 which allows the user 104 to manage basic information associated with his/her account, such as his/her home address and payment instruments. The preferences management interface 506 may also allow the user to manage other details such as his/her favorite or preferred warehouses 210, preferred delivery times, special instructions for delivery, and so on.

Shopper Mobile Application

Figure 5B:
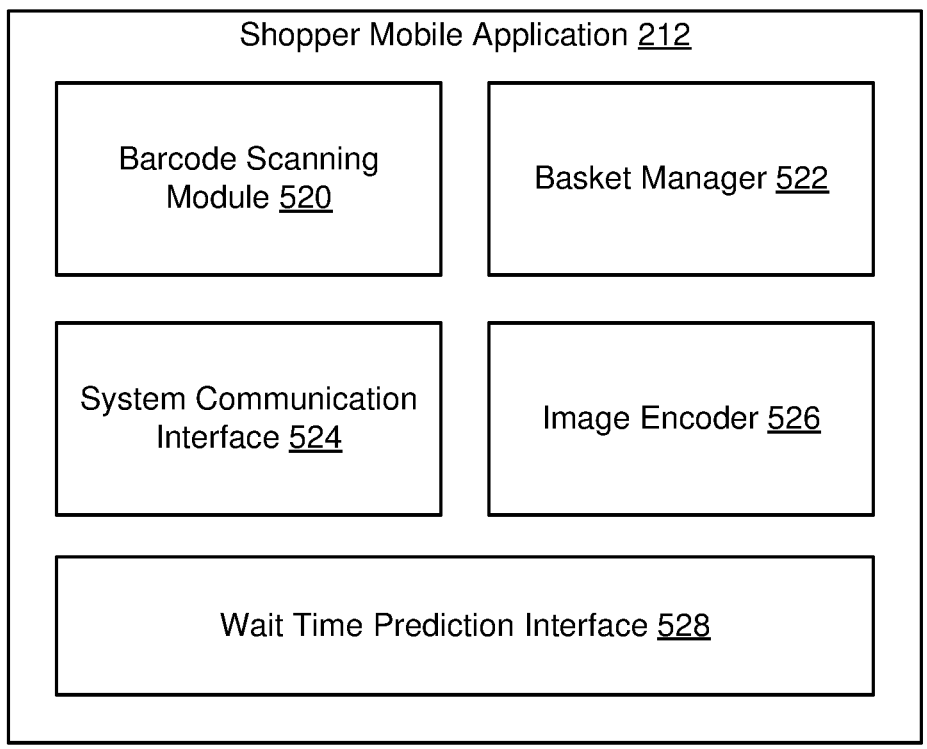
FIG. 5B is a diagram of a shopper mobile application (SMA), according to one or more embodiments.

FIG. 5B is a diagram of the shopper mobile application (SMA) 212, according to one or more embodiments. The SMA 212 includes a barcode scanning module 520 which allows a shopper 208 to scan an item at a warehouse 210 (such as a can of soup on the shelf at a grocery store). The barcode scanning module 520 may also include an interface which allows the shopper 108 to manually enter information describing an item (such as its serial number, SKU, quantity and/or weight) if a barcode is not available to be scanned. SMA 212 also includes a basket manager 522 which maintains a running record of items collected by the shopper 208 for purchase at a warehouse 210. This running record of items is commonly known as a "basket." In one embodiment, the barcode scanning module 520 transmits information describing each item (such as its cost, quantity, weight, etc.) to the basket manager 522, which updates its basket accordingly. The SMA 212 also includes a system communication interface 524 which interacts with the online shopping concierge system 102. For example, the system communication interface 524 receives an order from the online concierge system 102 and transmits the contents of a basket of items to the online concierge system 102. The SMA 212 also includes an image encoder 526 which encodes the contents of a basket into an image. For example, the image encoder 526 may encode a basket of goods (with an identification of each item) into a QR code which can then be scanned by an employee of the warehouse 210 at check-out.

The shopper mobile application 212 also includes a wait time prediction interface 528 configured to show a predicted wait time of the shopper based on the shopper's current location, and/or suggest the shopper a second location. In some embodiments, the shopper mobile application 212 is configured to determine the shopper's location based on a global positioning system (GPS) of a client device on which the shopper mobile application 212 is installed thereon. Responsive to determining the shopper's location, the shopper mobile application 212 sends the detected location to the online concierge system 102, which in turn causes the wait time prediction model 324 to predict a wait time of the shopper based on the received current location of the shopper. The online concierge system 102 then causes the predicted wait time to be transmitted to the shopper mobile application 212, which in turn causes the wait time prediction interface 528 to display the predicted wait time for the current location to the shopper.

In some embodiments, the online concierge system 102 also identifies one or more second locations based on the shopper's current location. In some embodiments, the one or more second locations are determined based on their distance from the shopper's current location and their distances to a store or a warehouse. In some embodiments, the one or more second locations are within a first distance threshold from the shopper's current location and within a second distance threshold from at least one store or warehouse. Responsive to identifying the one or more second locations, the online concierge system 102 causes the wait time prediction model 324 to predict a wait time for each of the one or more second locations, and send the predicted wait time for at least one of the one or more second locations to the shopper mobile application 212. The shopper mobile application 212 also causes the wait time prediction interface 528 to display the predicted wait time for the at least one second location to the shopper.

In some embodiments, the online concierge system 102 further computes a travel time for the shopper to move from the current location to each of the one or more second locations, and predicts a total wait time including the travel time and the wait time for each of the one or more second locations. The total wait time of at least one of the one or more second locations is sent to the shopper mobile application 212, which causes the total wait time to be displayed to the shopper via the wait time prediction interface 528.

In some embodiments, only when the total wait time of a second location is shorter than the wait time of the current location, the online concierge system 102 sends the total wait time of the second location to shopper mobile application 212, and the total wait time of the second location is caused to be displayed via the wait time prediction interface 528.

In some embodiments, the online concierge system 102 further predicts a likelihood of whether the shopper will move to a second location based on the historical information about the shopper. Only when the predicted likelihood is greater than a threshold, the online concierge system 102 sends the predicted wait time of the second location to the shopper mobile application 212, which causes the total wait time to be displayed to the shopper via the wait time prediction interface 528.

In some embodiments, the wait time prediction interface 528 is configured to generate a map showing the current location of the shopper and its corresponding wait time, and one or more second locations near the current location of the shopper and their corresponding wait time. In some embodiments, the map also shows a travel route from the current location of the shopper to a second location. In some embodiments, if the shopper is currently at a best location, and no second location is likely to result in receiving an order sooner for the shopper, the wait time prediction interface 528 provides such information to the shopper too.

Figure 6B:
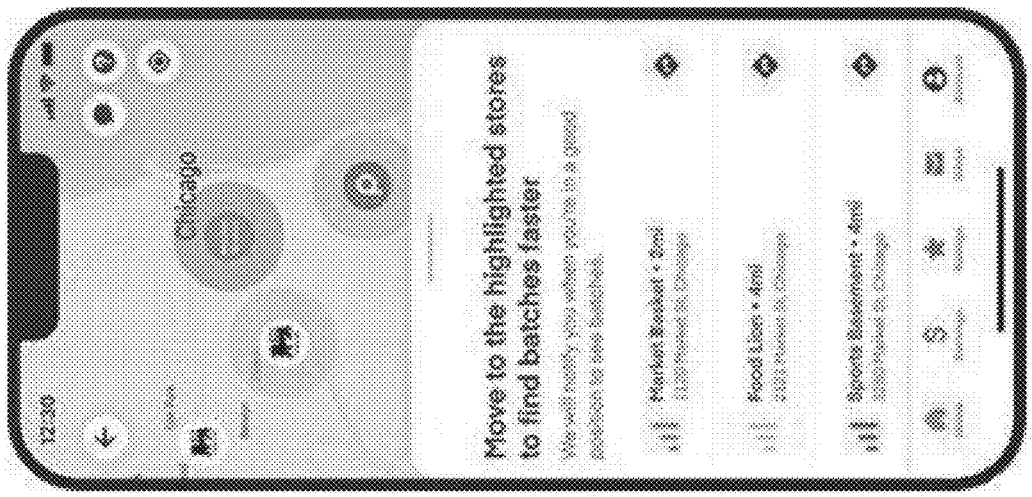
FIG. 6B is an example user interface of an SMA showing a shopper a predicted wait time at a current location and alternative locations using color coding, according to one or more embodiments.
Figure 6A:
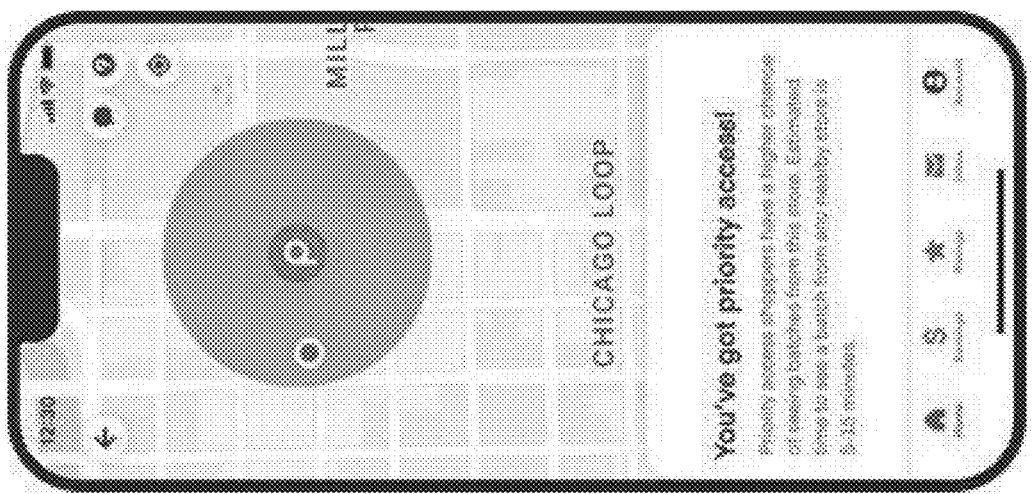
FIG. 6A is an example user interface of an SMA showing a shopper a predicted wait time at a current location, according to one or more embodiments.
Figure 6D:
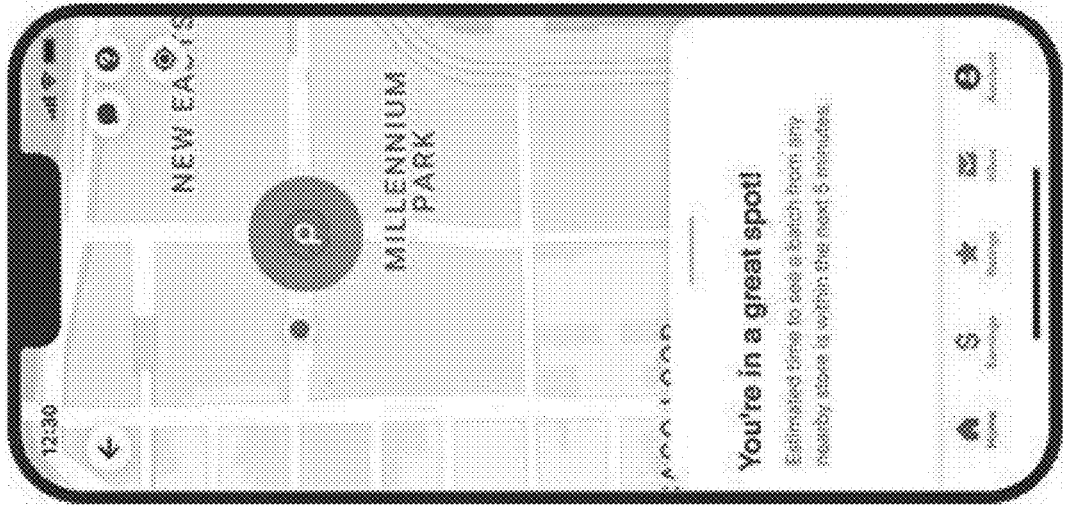
FIG. 6D is an example user interface of an SMA showing that the shopper is currently located at a good location, according to one or more embodiments.

FIGS. 6A-6D illustrate examples of graphical user interfaces (GUIs) 600A-D that may be displayed to shoppers, which corresponds to the wait time prediction interface 528 of FIG. 5B. GUI 600A of FIG. 6A shows that a wait time of the shopper at a current location is about 5-15 minutes. GUI 500A also shows that the shopper is currently located at a good location that is within a predetermined threshold of a store, such that the shopper is provided with priority access.

GUI 600B of FIG. 6B shows the shopper's current location and three alternative locations. The three alternative locations are highlighted. The GUI 600B also shows a distance from the current location to each of the alternative locations. The predicted wait time for the shopper to receive an order from each of the alternative locations is indicated by colors. For example, an orange color may indicate that the wait time is within a first threshold (e.g., within ten minutes), a yellow color may indicate that the wait time is between the first threshold and a second threshold (e.g., 10 to 15 minutes), and so on and so forth.

Figure 6C:
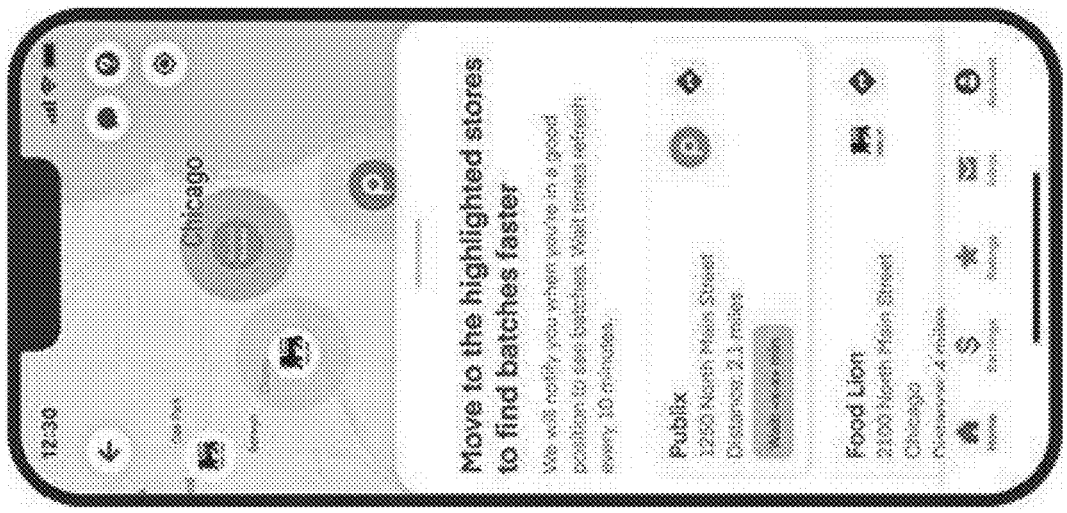
FIG. 6C is an example user interface of an SMA suggesting that a shopper move to an alternative location, according to one or more embodiments.

GUI 600C of FIG. 6C shows the shopper's current location and three alternative locations, and also suggests that the shopper move to one of the alternative locations. If the shopper chooses to move to the suggested location, online concierge system 102 may cause the wait time prediction model 324 to generate an updated prediction, and causes the GUI to present information related to the updated prediction. For example, after the shopper moves from the current location to the suggested location, shopper mobile application 212 may update its wait time prediction interface 528 from GUI 600C of FIG. 6C to GUI 600D of FIG. 6D, which shows that the shopper is now in a great spot.

Example Method for Predicting a Wait Time for a Shopper

Figure 7:
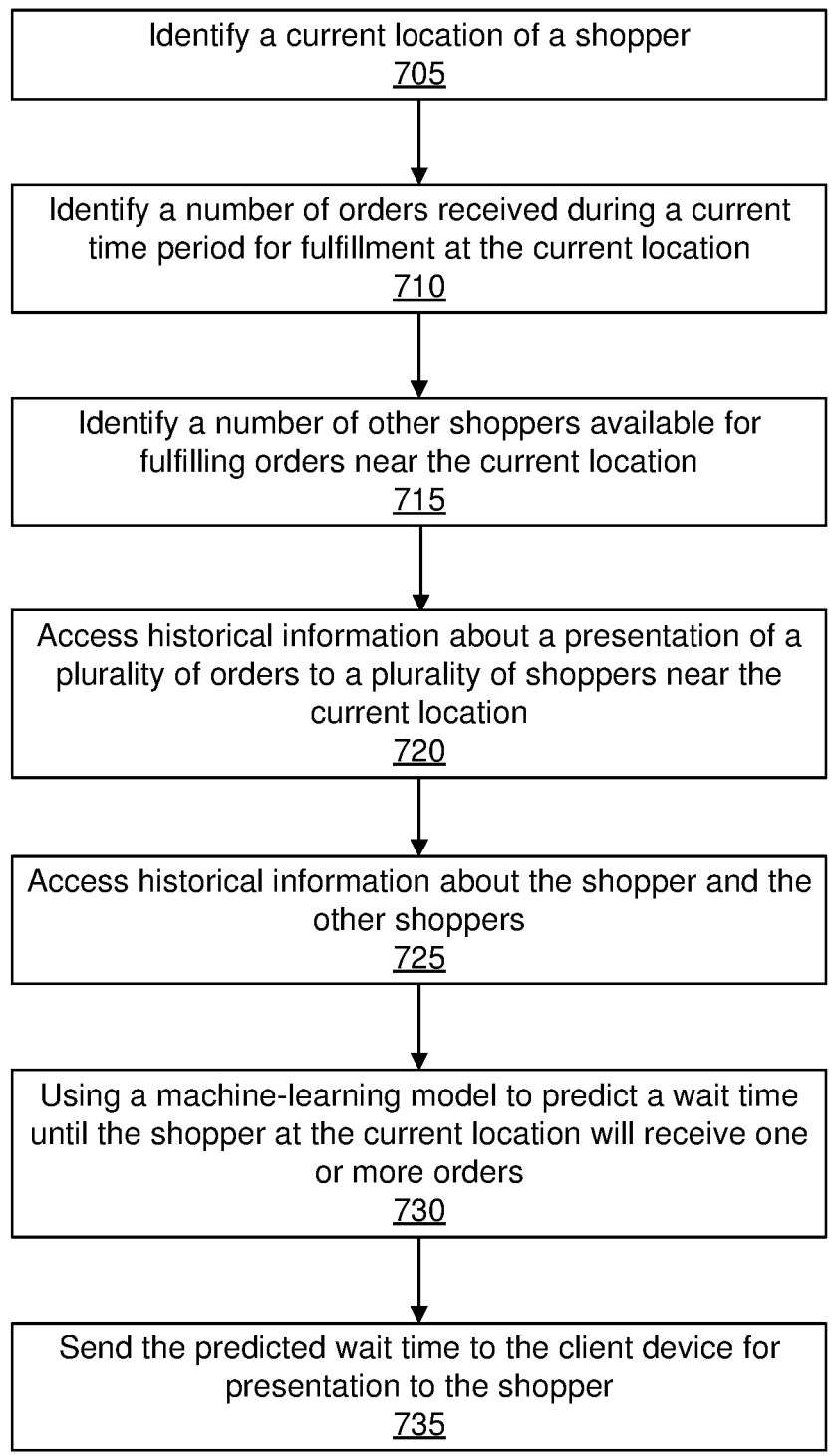
FIG. 7 is a flowchart of an example method for predicting a wait time of a shopper at a current location, according to one or more embodiments.

FIG. 7 is a flowchart of one embodiment of a method 700 for using a machine learning model to predict a wait time for a shopper. In various embodiments, the method includes different or additional steps than those described in conjunction with FIG. 7. Further, in some embodiments, the steps of the method may be performed in different orders than the order described in conjunction with FIG. 7. The method described in conjunction with FIG. 7 may be carried out by the online concierge system 102 in various embodiments, while in other embodiments, the steps of the method are performed by any online system capable of retrieving items and communicating with various client devices.

The online concierge system 102 identifies 705 a current location of a shopper based on a location of a client device of the shopper. For example, the shopper mobile application 212 installed on a client device of the shopper is configured to obtain the current location of the shopper, and transmit the current location of the shopper to the shopper management engine 310 of the online concierge system 102.

The online concierge system 102 identifies 710 a number of orders received during a current time period for fulfillment at the current location. In some embodiments, the order fulfillment engine 306 is configured to receive orders from customer mobile application 206 of customers. The order fulfillment engine 306 identifies a number of orders received during the current time period for fulfillment at the current location.

The online concierge system 102 identifies 715 a number of other shoppers available for fulfilling orders near the current location. In some embodiments, the shopper mobile application 212 of each shopper identifies the corresponding shopper's location and transmits the corresponding shopper's location to the shopper management engine 310. The shopper management engine 310 of the online concierge system 102 identifies the number of shoppers near the current location based on the received shoppers' locations.

The online concierge system 102 accesses 720 historical information about a presentation of a plurality of orders to a plurality of shoppers near the current location. In some embodiments, the historical information about the current location may be obtained from the transaction records database 308.

The online concierge system 102 accesses 725 historical information about the shopper and the other shoppers who are currently available for fulfilling orders near the current location. In some embodiments, the historical information about the shopper and the other shoppers may be obtained from the shopper database 312.

The online concierge system 102 uses 730 a machine learning model (e.g., the wait time prediction model 324) to predict a wait time until the shopper at the current location will receive one or more orders. The machine learning model is trained to use input features, including (1) a number of orders received during a current time period for fulfillment near the current location (e.g., within a distance threshold from the current location), (2) a number of other shoppers available for fulfilling orders during the current time period near the current location, (3) historical information about a presentation of a plurality of orders to a plurality of available shoppers near the current location, and (4) historical information about the shopper and the other shoppers who are currently available for fulfilling orders near the current location.

The online concierge system 102 sends 735 the predicted wait time to the client device for presentation to the shopper. In some embodiments, the predicted wait time is sent to the shopper mobile application 212 of the shopper. The shopper mobile application 212 includes a wait time prediction interface 528, which may be a GUI (e.g., GUIs 600A-D) configured to display a map showing the shopper's current location and the predicted wait time.

In some embodiments, the online concierge system 102 is further configured to predict a second wait time for a second location different from the current location of the shopper and sends the second wait time to the client device for presentation to the shopper. In some embodiments, the wait time prediction interface 528 further shows the second location on a map and the predicted second wait time.

In some embodiments, the online concierge system 102 is further configured to periodically determine whether one of the following has changed: (1) the current location of the shopper, (2) the number of orders received during a current time period for fulfillment near the current location, or (3) the number of the other shoppers available for fulfilling orders during the current period near the current location. Responsive to determining a change of at least one of the above, the online concierge system 102 repeats one or more of steps 705 through 735 of method 700.

In some embodiments, the online concierge system 102 further predicts a likelihood that the shopper will accept an order at the second location based on the historical information about the shopper, and responsive to the predicted likelihood greater than a threshold, the system suggests the second location to the shopper.

In some embodiments, the online concierge system 102 further compares an actual wait time with a predicted wait time of the shopper associated with a location to determine a difference between the actual wait time and the predicted wait time. Responsive to determining that the difference between the actual wait time and the predicted wait time is greater than a threshold for the shopper, the online concierge system 102 includes the actual wait time as additional training data to tune or retrain the machine learning model. In some embodiments, responsive to determining that an average difference between the actual wait time and the predicted wait time for a predetermined period is greater than a threshold for the shopper, the online concierge system 102 stops showing wait time predictions of the location to the shopper.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   at a computer system comprising at least one processor and memory:
      identifying a current location of a shopper based on a location of a client device of the shopper;
      using a machine learning model to predict a first wait time until the shopper at the current location will receive one or more orders, wherein the machine learning model is trained to use a set of input features including:
         a number of orders received during a current time period for fulfillment near the current location,
         a number of other shoppers available for fulfilling orders during the current time period near the current location,
         historical information about a presentation of a plurality of orders to a plurality of shoppers available for fulfilling orders near the current location, and historical information about the shopper and the other shoppers available for fulfilling orders during the current time period near the current location, wherein the machine learning model is trained, using a training dataset including a plurality sets of input features, each labeled with a wait time of a shopper, by iteratively:

applying parameters of the machine learning model to the plurality sets of input features to predict wait times of shoppers;

determining a difference between the predicted wait times and the labeled wait times based on a loss function; and adjusting the parameters of the machine learning model to reduce the difference between the predicted wait times and the labeled wait times; and sending the predicted first wait time to the client device of the shopper; and transmitting instructions to the client device of the shopper, causing the client device of the shopper to display a graphical user interface, the graphical user interface including a map showing the current location of the shopper and the predicted first wait time until the shopper at the current location is expected to receive one or more orders.

2. The method of claim 1, further comprising:
determining a change of at least one of: (1) the current location of the shopper, (2) the number of orders received during the current time period for fulfillment near the current location, or (3) the number of other shoppers available for fulfilling orders during the current period near the current location;

responsive to determining the change, reusing the machine learning model to predict an updated first wait time based on the change; and sending the updated predicted first wait time to the client device of the shopper.

3. The method of claim 1, further comprising:
determining that the shopper is located near a second location; and responsive to determining that the shopper is located near the second location, using the machine learning model to predict a second wait time until the shopper will receive one or more orders.

4. The method of claim 3, further comprising:
predicting a travel time of the shopper from the current location to the second location; and predicting a third wait time including the second wait time and the travel time of the shopper from the current location to the second location.

5. The method of claim 4, further comprising:
suggesting the second location to the shopper based on the first wait time and the third wait time.

6. The method of claim 5, wherein suggesting the second location to the shopper comprises:
determining whether the third wait time is less than the first wait time; and responsive to determining that the third wait time is shorter than the first wait time, suggesting the second location to the shopper.

7. The method of claim 5, wherein suggesting the second location to the shopper comprises:
causing a map showing the current location and the second location to be presented by the client device of the shopper.

8. The method of claim 5, further comprising:
predicting a likelihood that the shopper will accept an order at the second location based on the historical information about the shopper; and responsive to the predicted likelihood greater than a threshold, suggesting the second location to the shopper.

9. The method of claim 1, further comprising:
comparing an actual wait time with a predicted wait time of the shopper associated with a location to determine a difference therebetween; and responsive to determining that the difference between the actual wait time and the predicted wait time is greater than a threshold, including data associated with the actual wait time as an additional training sample to tune or retrain the machine learning model.

10. The method of claim 1, further comprising:
comparing an actual wait time with a predicted wait time of the shopper associated with a location to determine a difference between the actual wait time and the predicted wait time; and responsive to determining that an average difference between an actual second wait time and the predicted wait time for a predetermined period is greater than a threshold for the shopper, stop showing wait time predictions of the location to the shopper.

11. The method of claim 1, wherein historical information about the shopper includes historical orders that the shopper has fulfilled at the current location or other locations.

12. The method of claim 1, wherein historical information includes information related to an expertise level of the shopper determined based on the historical orders that the shopper has fulfilled.

13. A computer program product comprising a non-transitory computer readable storage medium having instructions encoded thereon that, when executed by a processor, cause the processor to:

identify a current location of a shopper based on a location of a client device of the shopper;

use a machine learning model to predict a first wait time until the shopper at the current location will receive one or more orders, wherein the machine learning model is trained to use input features including:

a number of orders received during a current time period for fulfillment near the current location, a number of other shoppers available for fulfilling orders during the current time period near the current location, historical information about a presentation of a plurality of orders to a plurality of shoppers available for fulfilling orders near the current location, and historical information about the shopper and the other shoppers available for fulfilling orders during the current time period near the current location, wherein the machine learning model is trained, using a training dataset including a plurality sets of input features, each labeled with a wait time of a shopper, by iteratively:

applying parameters of the machine learning model to the plurality sets of input features to predict wait times of shoppers;

determining a difference between the predicted wait times and the labeled wait times based on a loss function; and adjusting the parameters of the machine learning model to reduce the difference between the predicted wait times and the labeled wait times; and send the predicted first wait time to the client device of the shopper; and transmit instructions to the client device of the shopper, causing the client device of the shopper to display a graphical user interface, the graphical user interface including a map showing the current location of the shopper and the predicted first wait time until the shopper at the current location is expected to receive one or more orders.

14. The computer program product of claim 13, the instructions further causing the processor to:

determine a change of at least one of: (1) the current location of the shopper, (2) the number of orders received during the current time period for fulfillment near the current location, or (3) the number of other shoppers available for fulfilling orders during the current period near the current location;

responsive to determining the change, reuse the machine learning model to predict an updated first wait time based on the change; and send the updated predicted first wait time to the client device for presentation to the shopper.

15. The computer program product of claim 13, the instructions further causing the processor to:

determine that the shopper is located near a second location; and responsive to determining that the shopper is located near the second location, use the machine learning model to predict a second wait time until the shopper will receive one or more orders.

16. The computer program product of claim 15, the instructions further causing the processor to:

predict a travel time of the shopper from the current location to the second location; and predict a third wait time including the second wait time and the travel time of the shopper from the current location to the second location.

17. The computer program product of claim 16, the instructions further causing the processor to:

suggest the second location to the shopper based on the first wait time and the third wait time.

18. The computer program product of claim 16, the instructions further causing the processor to:

determine whether the third wait time is less than the first wait time; and responsive to determining that the third wait time is shorter than the first wait time, suggest the second location to the shopper.

19. The computer program product of claim 16, the instructions further causing the processor to:

causing a map showing the current location and the second location to be presented by the client device of the shopper.

20. A computer system, comprising:

a processor, and a non-transitory computer readable storage medium having instructions encoded thereon that, when executed by the processor, cause the computer system to:

identify a current location of a shopper based on a location of a client device of the shopper;

use a machine learning model to predict a first wait time until the shopper at the current location will receive one or more orders, wherein the machine learning model is trained to use input features including:

a number of orders received during a current time period for fulfillment near the current location, a number of other shoppers available for fulfilling orders during the current time period near the current location, historical information about a presentation of a plurality of orders to a plurality of shoppers available for fulfilling orders near the current location, and historical information about the shopper and the other shoppers available for fulfilling orders during the current time period near the current location, wherein the machine learning model is trained, using a training dataset including a plurality sets of input features, each labeled with a wait time of a shopper, by iteratively:

applying parameters of the machine learning model to the plurality sets of input features to predict wait times of shoppers;

determining a difference between the predicted wait times and the labeled wait times based on a loss function; and adjusting the parameters of the machine learning model to reduce the difference between the predicted wait times and the labeled wait times; and send the predicted first wait time to the client device of the shopper; and transmit instructions to the client device of the shopper, causing the client device of the shopper to display a graphical user interface, the graphical user interface including a map showing the current location of the shopper and the predicted first wait time until the shopper at the current location is expected to receive one or more orders.

\* \* \* \* \*